Aug. 26, 1969        D. J. STARK           3,463,409
                      CARTRIDGE
              Filed Nov. 24, 1967
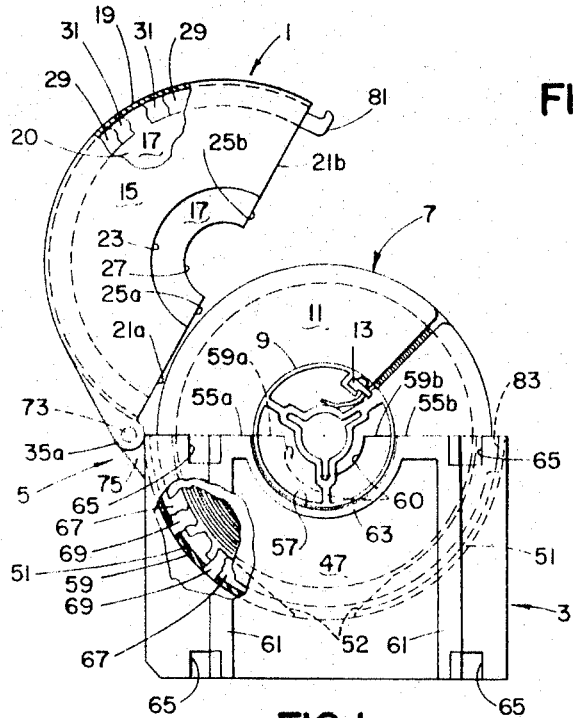
FIG.1
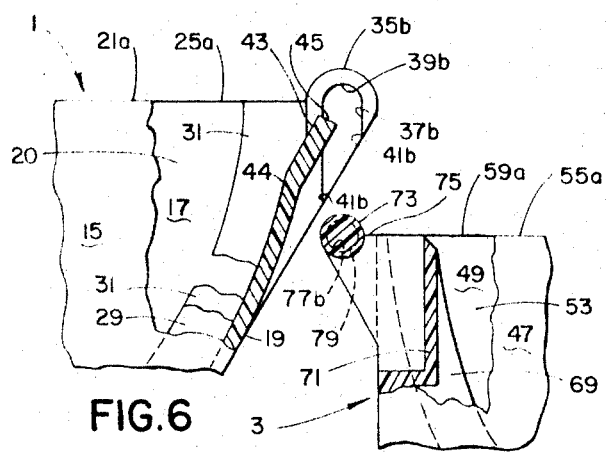
FIG.6
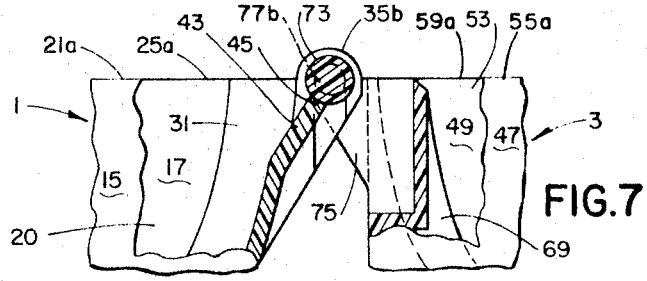
FIG.7
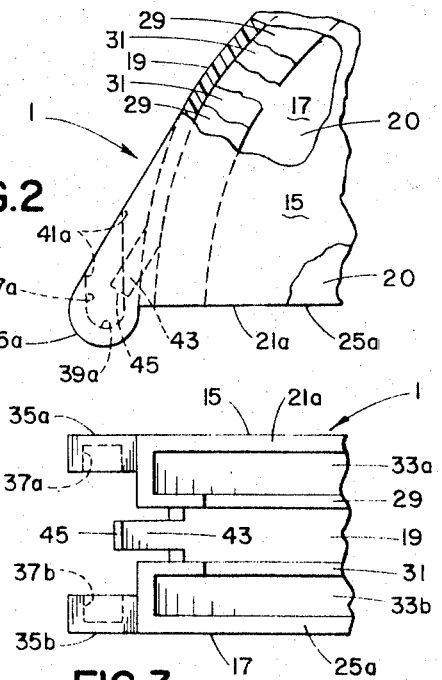
FIG.2
FIG.3
FIG.4
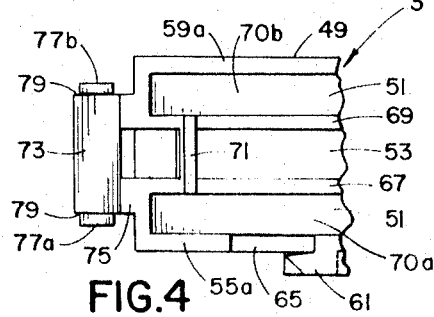
FIG.5
DANIEL J. STARK
INVENTOR.
BY Robert W Hampton
   J. Herman Childress
         ATTORNEYS

# United States Patent Office 3,463,409
Patented Aug. 26, 1969

3,463,409
CARTRIDGE
Daniel J. Stark, Rochester, N.Y., assignor to Eastman
Kodak Company, Rochester, N.Y., a corporation of
New Jersey
Filed Nov. 24, 1967, Ser. No. 685,683
Int. Cl. G03b 1/04
U.S. Cl. 242—71.1                           8 Claims

ABSTRACT OF THE DISCLOSURE

A cartridge for receiving a reel containing motion picture film or other strip material comprises two separate cartridge parts joined together by a hinge structure which opposes inadvertent separation of the cartridge parts.

Cross-reference to related applications

Reference is made to the following commonly assigned United States patent applications Ser. No. 685,616, entitled "Cinematographic Projectors or the Like and Cartridges for Use Therewith," filed on even date herewith in the name of John J. Bundschuh et al. and Ser. No. 685,631, entitled "Reel and Film Retaining Means," filed on even date herewith in the name of Evan A. Edwards et al. and Ser. No. 685,588, entitled "Cartridge," filed on even date herewith in the name of John J. Bundschuh, now abandoned and refiled as U.S. application Ser. No. 736,524.

Background of the invention

This invention relates to cartridges which are adapted to receive reels containing strip material and, more particularly, the invention relates to a two-piece cartridge construction wherein the cartridge parts are secured together by a hinge.

It is known in the art to provide cartridges for motion picture film or the like which are constructed of two separate cartridge parts hinged together near the interface between the cartridge parts. In some instances, the cartridge parts are difficult to connect together at the hinge during assembly of the cartridge. Other cartridges are hinged together so that the parts are subject to inadvertent separation from each other at the hinge.

Summary of the invention

Among the several objects of the invention may be noted the provision of a two-piece cartridge construction comprising a novel hinge structure for easily joining the two parts of the cartridge together; and the provision of an easily assembled two-piece cartridge construction wherein inadvertent separation of the parts at the hinge is avoided. Other objects of the invention will appear from the following description of the invention.

A cartridge of the invention comprises two cartridge parts each of which has a recess for receiving a portion of a reel for strip material or the like. The parts are engageable along edges bounding the opening into their respective recesses. A hinge pin carried by one of the cartridge parts has a central portion and two axially aligned end portions. Cooperating hinge structure carried by the other of the cartridge parts adjacent one end of the recesses therein comprises a pair of spaced hinge members each of which has a groove therein. Each groove has a closed inner end and an open end. The end portions of the pin pass through the open ends of the grooves toward the closed end thereof during assembly of the hinge structure. A latch member on the hinge opposes disassembly of the hinge structure. The latch member is positioned with respect to the groove so that a portion of the latch member is engageable by a portion of the pin upon attempted movement of the pin end portions from the closed end of the grooves toward the open end of the grooves.

Brief description of the drawings

FIG. 1 is an elevation view, partially broken away, of a preferred specific embodiment of a cartridge of the invention showing the cartridge opened and showing a reel of motion picture film or the like positioned within the lower cartridge part;

FIG. 2 is an enlarged fragmentary elevation of the hinge structure on the upper part of the cartridge;

FIG. 3 is a bottom view of the FIG. 2 structure;

FIG. 4 is a fragmentary plan of the hinge structure on the lower cartridge part;

FIG. 5 is a fragmentary elevation of the FIG. 4 hinge structure;

FIG. 6 is a fragmentary view of both cartridge parts showing the relative position of the hinge structure during assembly of the cartridge; and FIG. 7 is a view similar to FIG. 6 showing the parts fully assembled.

Corresponding reference characters indicate corresponding parts throughout the several views of the drawings.

Description of the preferred embodiment

Referring to the drawings, a cartridge of the invention comprises an upper cartridge part 1 which is attached to a lower cartridge part 3 by a hinge generally designated 5. The parts are swung about the hinge into an open position as shown in FIG. 1 for inserting or removing a reel 7 containing motion picture film or other strip material. The reel illustrated in the drawings comprises a core or hub and a pair of spaced, generally parallel flanges projecting radially outwardly from the hub. One of these flanges is shown in the drawings and is designated 11. The reel may comprise a pin 13 for securing the film to the hub 9. The pin projects axially beyond the side of the hub and the flanges in spaced relation to the axis of the hub. The pin can be used for properly locating the reel within the cartridge as explained later. Reference is made to the before-mentioned copending patent application entitled "Reel and Film Retaining Means" for a more complete description of the reel construction illustrated in the drawings. Other reel constructions can also be accommodated in the cartridge.

Referring now to FIGS. 1–3, cartridge part 1 comprises a pair of spaced, generally parallel, substantially semicircular walls 15 and 17 which are secured to an arcuate end wall 19. These walls define a generally semi-cylindrical recess 20 which opens to the bottom of part 1. The lower edge of wall 15 has substantially straight end portions 21a and 21b separated by a circular notch 23. Similarly, the lower edge of wall 17 comprises straight end portions 25a and 25b separated by a semicircular notch 27. Preferably, notch 27 is coaxial with notch 23 and has a smaller radius of curvature. The distance between reel pin 13 and the axis of hub 9 exceeds the radius of curvature of notch 27, but is less than the radius of curvature of notch 23. Because of this dimensional relation, the reel must be positioned within the cartridge with the pin projecting through notch 23. This assures proper orientation of the reel within the cartridge.

Cartridge part 1 preferably has a pair of spaced, generally parallel rails 29, 31 projecting radially inwardly from wall 19. The rails are spaced from walls 15 and 17 to define annular spaces 33a and 33b which receive the reel flanges 11. The rails preferably project from wall 19 by a distance sufficient to permit their reception into the spaces between the radially outer portion of reel flanges 11 so that the rails limit clock springing of the film to the area between the reel flanges.

Cartridge part 1 has a pair of spaced hinge members which cooperate with hinge structure on part 3 to form the hinge 5. The hinge members are shown in drawings in the form of a pair of generally parallel flanges 35a and 35b integrally formed with wall 19 and projecting from the outer surface thereof adjacent edges 21a and 25a, respectively. Flange 35a has a straight, elongate groove 37a recessed into the surface of the flange facing the flange 35b. The groove is closed at its inner end as shown at 39a and it is open at the opposite end, the open end being designated 41a and being located at the upper edge of the flange as viewed in FIG. 2. Flange 35b has a groove 37b (FIGS. 3 and 6) formed in the surface thereof facing flange 35a. Groove 37b is the mirror image of groove 37a and, accordingly, comprises a closed end 39b and an open end portion 41b. The grooves are aligned with each other as shown in FIG. 3 so that a hinge pin (described later) on part 3 can be inserted itno the grooves through the open ends thereof.

The hinge structure on part 1 further comprises a latch member shown in the form of a finger 43 projecting angularly outwardly from wall 19. The outer or tip end portion 45 of the finger normally lies between grooves 37a and 37b and about midway between the open and closed ends of the grooves. The finger 43 is flexible about a hinge area 44 so that it can be bent downwardly and inwardly (as viewed in FIG. 2) out of the space between the grooves when the latch structure on part 3 is being inserted into the grooves. Finger 43 also is resilient so that it snaps back to the position shown in FIGS. 2 and 3 once the hinge structure on part 3 passes the finger.

Referring onw to FIGS. 4 and 5, cartridge part 3 comprises a pair of spaced, substantially parallel, generally rectangular walls 47 and 49 which are secured to an arcuate wall 51. This construction provides a generally semicylindrical recess 53 in cartridge part 3 which opens to the top of part 3. When the cartridge parts are in closed position, recesses 53 communicate with the recess 20 in the upper cartridge part to form a substantially cylindrical chamber which accommodates the reel 7. Film stripped from the reel is fed through an opening 52 in wall 51.

The upper edge of wall 47 comprises straight end portions 55a and 55b separated by a generally semicircular notch 57, the latter having a radius substantially equal to the radius of notch 23 so that these two notches form a generally circular opening when the parts are closed. A spindle (not shown) of a movie projector of the like projects through this opening into the hub of the reel. The diameter of the opening thus formed is large enough to permit rotation of reel 7 relative to the cartridge without interference between the pin 13 and cartridge walls 15 or 47. The upper edge of cartridge wall 49 similarly has a pair of spaced straight edge portions 59a and 59b separated by a semicircular notch 60 having the same radius as notch 27. When the cartridge is closed, notches 60 and 27 jointly form a circular opening.

Wall 47 of the cartridge may be provided with spaced, generally parallel rails 61 joined at their upper ends by a rail 63. The rails 61 are adapted to be received into mating recesses formed in a projector face as described in the before-mentioned patent application entitled "Cartridge." A plurality of openings 65 are provided to receive clamping structure for attaching the cartridge to a projector as described in said patent application.

Cartridge part 3 has a pair of spaced rails 67 and 69 which project radially inwardly into the recess 53 from wall 51. The reel flanges 11 are received in spaces 70a, 70b between the rails and walls 47 and 49. The rails project into the space between reel flanges 11 to prevent clock springing of the film. Preferably, the space between rails 67 and 69 is spanned at each end of the rails by a cross-rib 71. The distance between these ribs is such that the reel flanges 11 must be inserted into the spaces between rails 67 and 69 and walls 47, 49, respectively, rather than into the space between the rails. Reference is made to the before-mentioned U.S. patent application entitled "Cartridge" for a more detailed description of the cross-ribs and their function. Cartridge part 3 carries a pin 73 forming part of hinge 5. The pin is supported at one end of part 3 by a pair of gussets 75 integrally formed with the pin and spaced from the end portions of the pin. The end portions of the pin are reduced in diameter to form spindles 77a and 77b each of which is separated from the center portion of the pin by a shoulder 79. The diameter of each spindle portion is substantially equal to the width of grooves 37a and 37b. Shoulders 79 are spaced apart by a distance slightly less than the spacing between flanges 35a and 35b. The pin lies in a plane substantially parallel to the interface between the parts.

Parts 1 and 3 are assembled together in the manner illustrated in FIGS. 6 and 7. First the parts are positioned as shown in FIG. 6 so that the hinge structure on part 1 overlies the hinge structure on part 3. Then, the spindles 77a and 77b are moved through the open ends of grooves 37a and 37b and seated in the closed ends of the grooves. As this occurs, the larger central portion of pin 73 engages the outer end 45 of latch finger 43, deflecting the finger upwardly and to the left (as viewed in FIGS. 6 and 7) about the hinge area 44. This deflection permits the pin to move through the grooves into the closed end of the grooves. The length of finger 43 is such that at the time the spindles reach the closed ends of the grooves, the outer end 45 of the finger clears the central portion of pin 73. The resilient finger then snaps back to its normal position between the grooves as shown in FIG. 7. When the finger is in this position, it blocks inadvertent or accidental withdrawal of the hinge pin from the grooves. Pin shoulders 79 are closely adjacent flanges 35a and 35b to limit relative movement between the hinge parts in a direction parallel to the axis of pin 73.

After the parts have been latched together in the manner described, part 1 can be swung about the hinge 5 and over a reel 7 positioned in cartridge part 3, thereby substantially enclosing the reel within the cartridge. The parts may be latched in this closed position by means of a latch member 81 on part 1 which is engageable with a latch bar 83 on part 3. The latch member and bar are preferably constructed in the manner described in the before-mentioned patent application, entitled "Cartridge."

As will be apparent from the preceding description, the two-piece cartridge construction of the invention comprises a hinge structure which permits easy assembly simply by pressing the hinge structure on part 1 onto the hinge structure on part 3. Moreover, the position of finger 43 with respect to pin 73 provides a hinge construction which effectively opposes separation of the parts at the hinge, thereby preventing inadvertent separation of the parts.

The invention has been described in detail with particular reference to a preferred embodiment thereof, but it will be understood that variations and modifications can be effected within the spirit and scope of the invention as described hereinabove and as defined in the appended claims.

I claim:

1. A cartridge comprising two cartridge parts each of which has a recess for receiving a portion of a reel of strip material;

a hinge pin carried by one of said cartridge parts, said pin having a central portion and two axially aligned end portions;

cooperating hinge structure carried by the other of said parts adjacent one end of the recesses therein, said hinge structure comprising a pair of spaced hinge members each of which has a groove therein, each groove comprising a closed inner end and an open end, the end portions of said pin passing through the open ends of said grooves toward the closed ends thereof during assembly of said hinge structure, and said hinge structure further comprising:

a latch member movable between two positions with respect to said grooves, said latch member when in its first position being engageable by said pin for blocking attempted removal of the pin end portions from the grooves through the open ends of the grooves, and the latch member when in its second position being positioned with respect to said grooves to allow insertion of the pin end portions into the groove closed ends from the open ends thereof without being blocked by the latch member.

2. A cartridge as set forth in claim 1 wherein said latch member comprises a resilient finger having an outer end portion positionable between said grooves when the latch member is in its first position so that the finger is engageable by the central portion of said pin during attempted withdrawal of the pin from the grooves, said finger being inclined toward the closed end of the grooves whereby the finger is adapted to be deflected to said second position by the central portion of the pin as the pin end portions are passed through the grooves during assembly of the hinge structure, the outermost end of the finger lying between the closed and open ends of the grooves and being spaced from the closed end of the grooves by a distance sufficient to allow the central portion of the pin to clear the finger when the pin end portions are seated in the closed ends of the grooves.

3. A cartridge as set forth in claim 1 wherein said hinge members comprise flanges positioned in substantially parallel planes, and said grooves are in facing surfaces of said flanges.

4. A cartridge as set forth in claim 3 wherein said end portions of said pin are smaller than the central portion thereof and are separated from said central portions by a pair of shoulders, said shoulders being larger than the width of said grooves and being spaced apart by a distance slightly less than the spacing between said flanges whereby movement of said pin toward either of said flanges is limited by engagement between said shoulders and said flanges.

5. A cartridge as set forth in claim 1 further comprising means projecting from a surface of the cartridge for locating the cartridge on a projector or the like.

6. A cartridge as set forth in claim 1 further comprising a plurality of openings in the cartridge adapted to receive clamping means for holding the cartridge onto a projector or the like.

7. A hinge comprising a hinge pin having a central portion and two end portions, and cooperating hinge structure comprising a pair of spaced hinge members each of which has a groove therein, each groove comprising a closed inner end and an open end, the end portions of said pin passing through the open ends of said grooves toward the closed ends thereof during assembly of said hinge structure, and said hinge structure further comprising a latch member movable between two positions with respect to said grooves, said latch member when in its first position being engageable by said pin for blocking attempted removal of the pin end portions from the grooves through the open ends of the grooves, and the latch member when in its second position being positioned with respect to said grooves to allow insertion of the pin end portions into the groove closed ends from the open ends thereof without being blocked by the latch member.

8. A hinge as set forth in claim 7 wherein said latch member comprises a resilient finger having an outer end portion positionable between said grooves when the latch member is in its first position so that the finger is engageable by the central portion of said pin during attempted withdrawal of the pin from the grooves, said finger being inclined toward the closed end of the grooves whereby the finger is adapted to be deflected to said second position by the central portion of the pin as the pin end portions are passed through the grooves during assembly of the hinge structure, the outermost end of the finger lying between the closed and open ends of the grooves and being spaced from the closed end of the grooves by a distance sufficient to allow the central portion of the pin to clear the finger when the pin end portions are seated in the closed ends of the grooves.

References Cited

UNITED STATES PATENTS

| | | | |
|---|---|---|---|
| 1,832,277 | 11/1931 | Caps | 242—71.1 X |
| 2,464,673 | 3/1949 | Debrie | 242—71.2 |
| 3,367,050 | 2/1968 | Doyle | 242—71.2 X |

NATHAN L. MINTZ, Primary Examiner